United States Patent Office 3,478,039
Patented Nov. 11, 1969

3,478,039
CERTAIN 2-, 4-, 5-, 6- OR 7-AZAINDOLYL-
LOWER-ALKYLAMIDOXIMES, -AMIDINES
AND -GUANIDINES
Malcolm Rice Bell, East Greenbush, N.Y., assignor to Sterling Drug Inc., New York, N.Y., a corporation of Delaware
No Drawing. Continuation-in-part of application Ser. No. 345,846, Feb. 19, 1964. This application Jan. 10, 1966, Ser. No. 519,458
Int. Cl. C07d 39/00 27/54
U.S. Cl. 260—295                                                                 16 Claims

ABSTRACT OF THE DISCLOSURE

2-, 4-, 5-, 6- or 7-azaindolyl - lower - alkylamidoximes, -amidines, and -guanidines.

---

This application is a continuation-in-part of my prior copending application Ser. No. 345,846, filed Feb. 19, 1964, which has matured into Patent No. 3,354,174.

This invention relates to the field of amidoximes, amidines, and guanidines, their acid-addition salts, and to intermediates and processes therefor.

The compounds of the invention are represented by the general formulas:

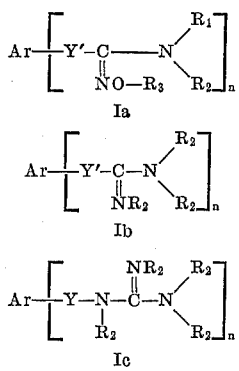

wherein Ar is a bicyclic aromatic nitrogen heterocyclic radical having fused five and six membered rings and containing from two to three ring nitrogen atoms which can be in any position of the two rings; indolyl (in the compounds of Formula Ia only); indolinyl; pyrrolyl; pyrazolyl; imidazolyl; phenothiazinyl; 10,11-dihydro-5H-dibenz-[b,f]azepinyl; dibenzo[a,d][1,4]cycloheptadienylidenyl; or 1,2,3,4-tetrahydrocarbazolyl; (in any of which values for Ar, the Y or Y' group can be attached to any non-bridging ring carbon or nitrogen atom of the Ar moiety); $R_1$ is hydrogen, lower-alkyl, lower-alkanoyl, or hydroxy; $R_2$ is hydrogen or lower-alkyl; $R_3$ is hydrogen, lower-alkanoyl, or lower-alkyl; Y', in the compounds of Formulas Ia or Ib, is a single chemical bond or alkylene containing from one to five carbon atoms; Y is alkylene containing from one to six carbon atoms; and $n$ is one of the integers 1 and 2. Moreover, when Y and Y' are alkylene, they can also be substituted on any of the carbon atoms thereof by a hydroxy group. The more convenient synthetic methods are based on use of an aldehyde cyanohydrin of the nitrile, Ar—Y'—CN, in the general procedures described herein, and these methods afford those compounds where the hydroxy group is attached to the carbon atom adjacent to the amidoxime group (Formula Ia) or the amidine group (Formula Ib), and such compounds are preferred.

In the above Formulas Ia, b, and c, $R_1$, $R_2$, and $R_3$, besides representing lower-alkyl, can also represent groups equivalent to lower-alkyl such as lower-alkenyl, e.g. 1-(2-propenyl), 1-(2-methyl-2-propenyl), and the like; lower-alkynyl, e.g. 1-(2-propynyl), 1-(2-butynyl); or benzyl. Moreover, in the compounds of Formulas Ib and Ic, the groups $R_2$ on the terminal nitrogen atom can be the same or different or can be joined together either through an alkylene chain or an alkylene chain interrupted by a hetero atom to form, with the nitrogen atom to which they are attached, a heterocyclic ring such as pyrrolidine, piperidine, morpholine, thiomorpholine, and the like.

Furthermore, the groups $R_1$ and $R_3$ besides representing lower-alkanoyl can also represent groups equivalent to lower-alkanoyl such as benzoyl.

When Ar represents a bicyclic aromatic nitrogen heterocyclic radical having fused five and six membered rings and containing from two to three ring nitrogen atoms which can be in any position of the two rings, it is preferably of the 4.3.0 bridged system and is attached to Y' (or Y) through an atom of the five membered ring. An especially preferred group of said heterocyclic bicyclic radicals includes 1- and 3-(2-azaindolyl); 1-, 2-, and 3-(4-azaindolyl); 1-, 2-, and 3-(5-azaindolyl); 1-, 2-, and 3-(6-azaindolyl); 1-, 2-, and 3-(7-azaindolyl); 1- and 2-benzimidazolyl; 1-(1-H-benzotriazolyl); 2-(2-H-benzotriazolyl); and 3-pyrido-[2,1-c]-s-triazolyl).

The compounds of Formula Ia where Y' is a hydroxyalkylene group having the hydroxy group attached to the carbon atom adjacent to the amidoxime group have the structure:

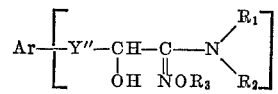

where $R_1$, $R_2$, $R_3$, Ar, and $n$ have the meanings given above, and Y" is $C_mH_{2m}$ where $m$ is an integer from 0 to 4.

In the above general Formulas Ia, Ib, and Ic, when $R_1$, $R_2$, or $R_3$ represent lower-alkyl, the lower-alkyl moiety can be straight or branched and can contain from one to about four carbon atoms. Thus $R_1$, $R_2$, and $R_3$ represent, inter alia, methyl, ethyl, isopropyl, or n-butyl.

In the above general Formula Ia, when $R_1$ and $R_3$ are lower-alkanoyl, they can be straight or branched and can contain from one to about four carbon atoms. Thus $R_1$ and $R_3$ represent, inter alia, formyl, acetyl, propionyl, or isobutyryl.

In the above general Formulas Ia, Ib, and Ic, when Y and Y' represent alkylene, they can be straight or branched, and when the group Y in the compounds of Formula Ic is attached to a nitrogen atom of a heterocyclic group, is such that at least two carbon atoms separate the nitrogen atoms of the heterocyclic group and the guanidine group. The alkylene group Y thus stands, inter alia, for methylene, 1,2-ethylene, 2-methylethylene, 1,3-propylene, 2-methyl-1,4-butylene, 1,6-hexylene; and the group Y' thus stands, inter alia, for methylene, 1,2-ethylene, 2-methylethylene, 1,3-propylene, 2-methyl-1,4-butylene, and 1,5-pentylene.

In the above general Formula Ia, b, or c, when $R_1$, $R_2$, or $R_3$ represents benzyl or in the compounds of Formula Ia, when $R_1$ and $R_3$ represent benzoyl, the benzene ring thereof can be unsubstituted or can bear one or more substituents of low molecular weight and of such nature that they do not interfere with or take part in the reactions, to be described hereinafter, used in the preparation of the compounds. Moreover, the nucleus of the group Ar in any of the compounds of Formula Ia, Ib, or Ic can also be further substituted in any of the rings thereof by one or more of such substituents. Examples of such substituents include halogen, lower-alkyl, lower-alkoxy, lower-alkyl-mercapto, lower-alkylsulfinyl, lower-alkylsulfonyl, nitro, trifluoromethyl, methylenedioxy, benzyloxy, benzyl, isonitrosomethyl, di-lower-alkylamino, lower-alkanoyl, sulfamoyl, and the like.

The compounds of Formula I$a$ where $R_1$, $R_2$, and $R_3$ are hydrogen are prepared by reacting an aryl-nitrile or an aryl-alkanonitrile with hydroxylamine (suitably in the form of a hydrohalide salt) in an organic solvent inert under the conditions of the reaction and in the presence of a base, for example, alkali metal hydroxides, alkoxides, or carbonates. A preferred base is an alkali metal carbonate, for example, potassium carbonate or sodium carbonate. Suitable organic solvents are methanol, ethanol, isopropanol, benzene, toluene, and the like. A preferred solvent is ethanol. The reaction is represented by the equation:

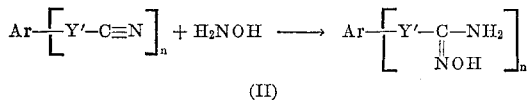

(II)

where Ar, Y′, and $n$ have the meanings given above.

The aryl-alkanonitriles of Formula II required as intermediates in the above-described procedure are prepared by a variety of methods. One method involves the direct alkylation of an aryl nucleus using an appropriate halo-alkanonitrile. The alkylation can take place either on a heterocyclic nitrogen atom bearing a replaceable hydrogen atom, or it can take place on a carbon atom bearing an activated hydrogen atom. The former is illustrated by the preparation of a 1-(cyano-alkyl)indole which is produced when indole (or a substituted-indole) is reacted with a halo-alkanonitrile in the presence of an acid-acceptor. If alkylation of a ring carbon atom is desired, it may be necessary to carry out the alkylation indirectly, that is, by reacting the halo-alkanonitrile with a Grignard reagent. This latter method is illustrated by the preparation of a 3-indolyl-alkanonitrile which is produced by reacting a halo-alkanonitrile with a Grignard reagent formed from indole (or a substituted indole) and a lower-alkyl magnesium halide.

A second method for the preparation of the aryl-alkanonitriles of Formula II in which the alkylene group, Y′, is 1,2-ethylene comprises reacting acrylonitrile with an aromatic compound having an "activated" hydrogen atom either attached to a carbon atom or to a heterocyclic nitrogen atom. The reaction in the former case generally takes place spontaneously on admixture of the aromatic compound with the acrylonitrile, but in the latter case, it is generally necessary to employ a strong base as catalyst, for example, potassium t-butoxide, sodium hydride, organo ammonium hydroxides, for example, Triton B ®, and the like.

The aryl-alkanonitriles of Formula II in which the alkylene group, Y′, is 1,2-ethylene can also be prepared by the catalytic reduction of the corresponding 3-aryl-acrylonitrile. The latter in turn is prepared by reacting an appropriate aryl carboxaldehyde with cyanoacetic acid under basic conditions and decarboxylating the resulting 3-aryl-2-cyanoacrylic acid over copper chromite.

Still another method for the preparation of the aryl-alkanonitriles of Formula II where the alkylene group, Y′, is methylene comprises metathetical replacement of a tertiary amino group of a Mannich base with cyanide ion. This method is illustrated by the preparation of 3-cyanomethyl-7-azaindole from 7-azagramine. The reaction is generally carried out in an aqueous medium at the reflux temperature using equimolar amounts of an alkali metal cyanide and a mineral acid. A preferred reaction medium is aqueous dimethylformamide.

In some cases it is desirable to introduce the alkanonitrile side chain at the time of formation of the aromatic ring to which it is attached. Thus a cyanomethyl group is introduced at the 2-position of the benzimidazole nucleus by reacting o-phenylenediamine with ethyl cyanoacetate. The reaction is preferably carried out in the absence of a solvent.

The compounds of Formula I$a$ where $R_1$ is lower-alkyl and $R_2$ is hydrogen, or where both $R_1$ and $R_2$ are lower-alkyl, are prepared by reacting a hydroxamic chloride derivative of Formula III below, wherein $R_3$, Ar, Y′, and $n$ have the meanings given hereinabove, with a lower-alkylamine or a di-lower-alkylamine, $R_1R_2NH$. The compounds of Formula I$a$ where $R_1$ is hydroxy and $R_2$ is hydrogen or lower-alkyl are prepared by reacting a hydroxamic chloride derivative of Formula III below, wherein Ar, Y′, $R_3$, and $n$ have the meanings given hereinabove, with hydroxylamine or an N-lower-alkylhydroxylamine, $R_2NHOH$. These reactions are represented by the following equations:

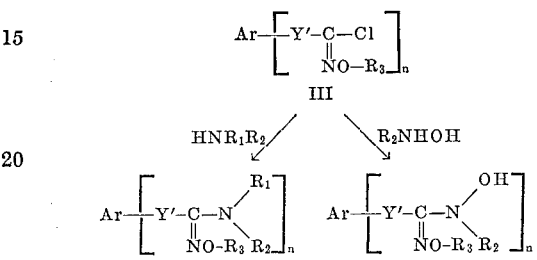

A preferred starting material of Formula III is one wherein $R_3$ is benzyl. The products can then be debenzylated with hydrogen over a suitable catalyst, for example, palladium-on-charcoal or Raney nickel, to produce compounds of Formula I$a$ where $R_3$ is hydrogen.

The arylhydroxamic chloride-O-benzyl ethers or aryl-alkylhydroxamic chloride-O-benzyl ethers of Formula III ($R_3$ is $CH_2C_6H_5$) are prepared by reacting the corresponding arylamidoxime-O-benzyl ether or aryl-alkanoamidoxime-O-benzyl ether of Formula I$a$, where $R_1$ and $R_2$ are hydrogen and $R_3$ is benzyl, with an alkali metal nitrite in the presence of hydrochloric acid under diazotization conditions. The reaction is represented by the following equation:

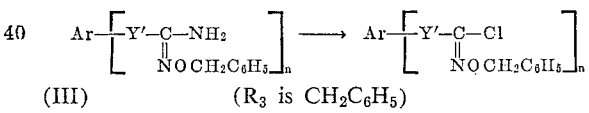

(III)    ($R_3$ is $CH_2C_6H_5$)

where Ar, Y′, and $n$ have the meanings given above.

The arylhydroxamic chlorides or aryl-alkylhydroxamic chlorides of Formula III ($R_3$ is H) are prepared by the reaction of chlorine in chloroform with the corresponding aldoxime.

The compounds of Formula I$a$ where $R_3$ is lower-alkyl or benzyl are prepared by reacting the corresponding amidoxime, where $R_3$ is hydrogen, with an alkali metal hydride in a suitable organic solvent inert under the conditions of the reaction, for example, dimethylformamide, and reacting the resulting alkali metal salt with a lower-alkyl halide or a benzyl halide. Alternatively, the alkali metal salt can be prepared by reacting the amidoxime with an alkali metal hydroxide in an aqueous or alcoholic medium, e.g. methanol, ethanol, or isopropanol. The reaction is represented by the equation:

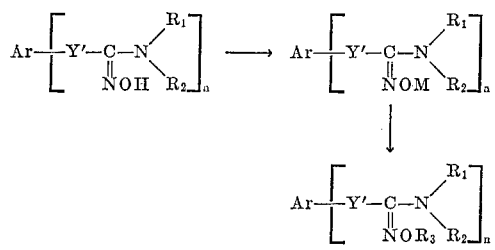

where $R_1$, $R_2$, $R_3$, Ar, Y′, and $n$ have the meanings given above, except that $R_1$ is not hydroxy, and M represents an ion of an alkali metal.

The compounds of Formula I$a$ where $R_1$ is lower-alkanoyl are prepared by reacting the corresponding amidoxime ethers, where $R_3$ is lower-alkyl or benzyl and $R_1$ is hydrogen, with a lower-alkanoyl halide. When it is desired to prepare the compounds of Formula I$a$ where $R_1$ is lower-alkanoyl and $R_3$ is hydrogen, it is necessary to carry out the reaction with the lower-alkanoyl halide using the amidoxime O-benzyl ether ($R_3$ is benzyl). Subsequent catalytic debenzylation affords the compounds where $R_3$ is hydrogen.

The compounds of Formula I$a$ where $R_3$ is lower-alkanoyl or benzoyl and $R_1$ is hydrogen or lower-alkyl are prepared by reacting the corresponding amidoxime with a lower-alkanoic anhydride or with benzoic anhydride, as the case may be, in the presence of a base such as pyridine. The reaction is preferably carried out in an excess of pyridine, as the solvent medium, and at a temperature in the range from about 0° C. to about 50° C.

The compounds of Formula I$a$ where Y' is a hydroxyalkylene group with the hydroxy group attached to the carbon atom adjacent to the amidoxime group are prepared by reacting the corresponding cyanohydrin with hydroxylamine using the same conditions as described above for the preparation of the compounds of Formula I$a$ where Y' is a single bond or alkylene. The reaction is represented by the equation:

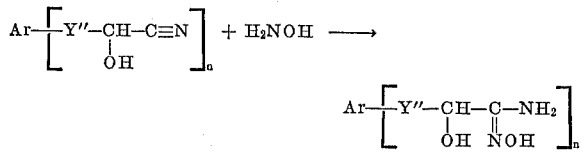

where Ar, Y'', and $n$ have the meanings given above.

The intermediate cyanohydrins are prepared by reaction of hydrogen cyanide with the corresponding aryl-alkanaldehyde.

The compounds of Formula I$b$ are prepared by reacting the corresponding arylnitrile or aryl-alkanonitrile with a lower-alkanol in the presence of a mineral acid, for example hydrogen chloride, under anhydrous conditions and reacting the resulting imino ester with anhydrous ammonia in an anhydrous lower-alkanol. The method is represented by the following equations:

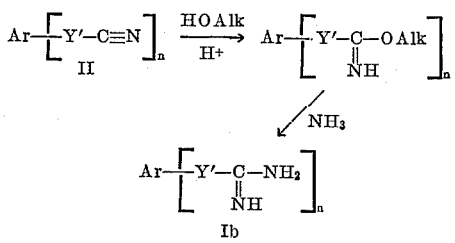

where Ar, Y', and $n$ have the meanings given above and Alk represents lower-alkyl.

The compounds of Formula I$c$ are prepared by reacting a lower-alkyl isothiouronium halide with the corresponding aryl-alkylamine of Formula IV below. The reaction is preferably carried out in an aqueous or lower-alkanol medium at the reflux temperature thereof. The reaction is represented by the equation:

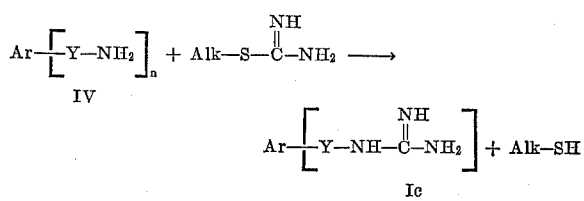

where Ar, Y, and $n$ have the meanings given above, and Alk represents lower-alkyl.

The aralkylamines of Formula IV are prepared by catalytic hydrogenation of the corresponding aryl-alkanonitriles of Formula II.

The novel compounds of the instant invention are the bases of Formulas I$a$, I$b$, and I$c$ and the acid-addition salts of said bases, and said acid-addition salts are considered to be the full equivalents of the free bases. The compounds of the invention in free base form are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates and alkali metal bicarbonates. The bases thus regenerated can then be interacted with the same or a different acid to give back the same or a different acid-addition salts. Thus the novel bases and all of their acid-addition salts are readily interconvertible.

It will thus be appreciated that Formulas I$a$, I$b$, and I$c$ not only represent the structural configurations of the bases of my invention but each is also representative of the respective structural entity which is common to all of my respective compounds, whether in the form of the free bases or in the form of the acid-addition salts of the bases. I have found that by virtue of this common structural entity, the bases and their acid-addition salts have inherent pharmacodynamic activity of a type to be more fully described hereinbelow. This inherent pharmacodynamic activity can be enjoyed in useful form for pharmaceutical purposes by employing the free bases themselves or the acid-addition salts formed from pharmaceutically-acceptable acids, that is, acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, I prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with aqueous base as described above, or alternatively they can be converted to any desired pharmaceutically-acceptable acid-addition salt by double decomposition reactions involving the anion, for example by ion-exchange procedures.

Moreover, apart from their usefulness in pharmaceutical applications, my salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively they can be converted to pharmaceutically-acceptable acid-addition salts by, for example, ion-exchange procedures.

It will be appreciated from the foregoing that all of the acid-addition salts of my new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new amidoximes, amidines, and guanidines, and not in ane particular acid anion associated with the salt forms of the compounds; rather, the acid anions, which can be associated in the salt forms, are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formulas Ia, Ib, and Ic has demonstrated that they lower the blood pressure in dogs and rats thus indicating their usefulness as hypotensive agents. The compounds have also been shown to possess psychomotor depressant, psychomotor stimulant, anti-inflammatory, and hexobarbital potentiation activities thus indicating their usefulness as tranquilizers, C.N.S. stimulants, anti-inflammatory agents and sedatives.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection. Alternatively, they can be incorporated in unit dosage form as tablets or capsules for oral administration or in combination with suitable adjuvants such as calcium carbonate, starch, lactose, talc, magnesium stearate, gum acacia, and the like. Still further the compounds can be formulated for oral administration in aqueous alcohol, glycol, or oil solution or oil-water emulsions in the same manner as conventional medicinal substances are prepared.

The chemical structures of the compounds of the invention are established by their mode of synthesis and are corroborated by the correspondence between calculated values for the elements and values found by chemical analysis.

The following examples will further illustrate specific embodiments of the invention without the latter being limited thereto.

PREPARATION OF THE INTERMEDIATES

Example 1

(7-aza-1-indolyl)acetonitrile [II: Ar is 7-aza-1-indolyl; Y' is $CH_2$; $n$ is 1].—To a stirred solution of 5.9 g. (0.05 mole) of 7-azaindole in 50 ml. of hot dimethylformamide was added 1.2 g. (0.05 mole) of sodium hydride in mineral oil. When hydrogen evolution had ceased, a solution of 3.77 g. (0.05 mole) of chloroacetonitrile in 5 ml. of dimethylformamide was added over a period of fifteen minutes. The reaction was stirred at room temperature for two hours, and taken to dryness in vacuo. The residue was suspended in water and ether, extracted with a benzene/ethyl acetate mixture, and the combined organic extracts were taken to dryness. Recrystallization of the residue from ether afforded 3.8 g. of (7-aza-1-indolyl)acetonitrile, M.P. 81.8–83.8° C. (corr.).

Examples 2–6

The following compounds of Formula II in Table 1 were prepared from an appropriate aromatic compound and chloroacetonitrile using the manipulative procedure described above in Example 1. The melting points are uncorrected unless noted otherwise.

TABLE 1

| Ex. | Ar | Y' | $n$ | M.P./crystallized from— |
|---|---|---|---|---|
| 2 | 1,3-(7-azaindolyl) | $CH_2$ | 2 | 125.0–126.5° C. (corr.), benzene/isopropanol. |
| 3 | 1-indolyl | $CH_2$ | 1 | 75.5–77.0° C., cyclohexane. |
| 4 | 3-$CH_3$-1-indolyl | $CH_2$ | 1 | |
| 5 | 2-Cl-10-phenothiazinyl | $CH_2$ | 1 | 120–122° C. (corr.), ethanol |
| 6 | 1-benzimidazolyl | $CH_2$ | 1 | 136–137° C., benzene. |

Example 7

[3 - (2 - cyanoethyl) - 7 - aza - 1 - indolyl]acetonitrile [II: Ar is 1,3-(7-azaindolyl); Y' is $CH_2$(1-position) and $(CH_2)_2$ (3-position); $n$ is 2].—A solution of 29.0 g. (0.17 mole) of β-(3-indolyl)-propionitrile in 175 ml. of dimethylformamide was treated with 7.75 g. (0.32 mole) of sodium hydride in mineral oil. When hydrogen evolution had ceased, the mixture was treated with chloroacetonitrile and allowed to stand for two days. The mixture was carefully decomposed with water, taken to dryness in vacuo, and the resulting oil suspended in water and extracted with ether. The organic extracts were taken to dryness and the residue extracted with hot cyclohexane. The residue from the cyclohexane extraction was dissolved in ether, washed once with aqueous sodium carbonate, once with water, and the solution evaporated to dryness. The residue, on recrystallization once from benzene/ethanol and once from ethanol alone, afforded 9.02 g. of [3 - (2 - cyanoethyl) - 7 - aza - 1 - indolyl]acetonitrile, M.P. 106.5–108.0° C. (uncorr.).

By following the manipulative procedure described above in Examples 1 or 7, the following aryl-alkanonitriles of Formula II where, in each case, $n$ is 1 were prepared by reacting an aryl N-heterocyclic compound with an appropriate haloalkanonitrile in the presence of sodium hydride:

α-(3-chloro-1-indolyl)acetonitrile;
α-(3-bromo-1-indolyl)acetonitrile;
α-(3-methyl-1-indolyl)propionitrile;
α-(7-methyl-1-indolyl)acetonitrile;
α-(3-ethyl-1-indolyl)acetonitrile;
α - (3 - butyl - 1 - indolyl)acetonitrile, M.P. 42–3° C. (uncorr.) (recrystallized from pentane);
α - (2,5 - dimethyl - 3 - propyl - 1 - indolyl)acetonitrile, B.P. 100–130° C./0.05 mm.;
α-(5-methoxy-1-indolyl)acetonitrile;
α - (3 - acetyl - 1 - indolyl)acetonitrile, M.P. 163–166° C. (uncorr.) (recrystallized from ethanol);
α - (3 - propionyl - 1 - indolyl)acetonitrile, M.P. 105–115° C. (uncorr.) (recrystallized from a tetrahydrofuran-hexane mixture);
α - (3 - butyryl - indolyl)acetonitrile, M.P. 84–86° C. (uncorr.) (recrystallized from an ethyl acetate-hexane mixture);
α-(3-benzyl-1-indolyl)acetonitrile;
γ - [5 - (10,11) - dihydro - 5H - dibenz[b,f]azepinyl)] butyronitrile, M.P. 61.5–63.5° C. (uncorr.) (recrystallized from methanol);
α - [9 - (1,2,3,4 - tetrahydrocarbazolyl)]acetonitrile, M.P. 75° C. (uncorr.) (recrystallized from ethanol);
α - [1 - (1H - benzotriazolyl)]acetonitrile, M.P. 86.5–87.5° C. (uncorr.) (recrystallized from benzene); and
α - [2 - (2H - benzotriazolyl)]acetonitrile, M.P. 72–79° C. (uncorr.) (recrystallized from ethanol).

Example 8

δ-(3-indolyl)valeronitrile [II: Ar is 3-indolyl; Y' is $(CH_2)_4$; $n$ is 1].—A mixture of 5.2 g. (0.215 mole) of magnesium turnings suspended in ether was treated with a solution of 28.4 g. (0.20 mole) of methyl iodide in ether. The resulting mixture was treated with a solution of 23.4 g. (0.20 mole) of indole in ether, and the solution was refluxed for about thirty minutes. The mixture was then cooled in an ice bath and treated rapidly with a solution of 32.4 g. (0.20 mole) of δ-bromovaleronitrile in ether. The mixture was stirred in an ice bath for about two and one-half hours and then refluxed for eighteen hours. The mixture was then treated with aqueous ammonium chloride solution, and the organic layer was separated and washed three times with water, once with sodium bicarbonate, twice again with water, and taken to dryness giving 40.4 g. of a red-brown gum. Fractionation of the latter in vacuo and collection of the fraction boiling at 115–158° C./0.0003 mm. gave 14.9 g. of crude product which was recrystallized once from ethanol/pentane and once from ethyl acetate/hexane to give 10 g. of δ-(3-indolyl)valeronitrile, M.P. 64.0–65.8° C. (uncorr.).

Examples 9–12

The following compounds of Formula II in Table 2 were prepared from an appropriate indole and an appropriate ω-bromoalkanonitrile using the manipulative procedure described above in Example 8. The melting points are uncorrected unless noted otherwise.

TABLE 2

| Ex. | Ar | Y' | n | M.P./crystallized from— |
|---|---|---|---|---|
| 9 | 3-indolyl | (CH$_2$)$_5$ | 1 | 41.6–44.0° C. (corr.), ethyl acetate/hexane. |
| 10 | 2-CH$_3$-3-indolyl | (CH$_2$)$_4$ | 1 | 152.5° C.[1]/0.0007 mm. |
| 11 | 5,6-OCH$_2$O-3-indolyl | CH$_2$ | 1 | 168–169.5° C., benzene. |
| 12 | 5,6-di-CH$_3$O-3-indolyl | CH$_2$ | 1 | 132–133.5° C., benzene. |

[1] Boiling point.

Example 13

β-(3-indolyl)propionitrile [II: Ar is 3-indolyl; Y' is (CH$_2$)$_2$; n is 1].—A mixture of 117.2 g. (1.0 mole) of indole, 212 g. (4.0 mole) of acrylonitrile, 2.0 g. of cupric acetate, 3.0 ml. of glacial acetic acid, and 0.70 g. of boric acid was heated in an autoclave at 96–109° C. for ten hours. The mixture was then diluted with ether, filtered, the filtrate taken to dryness in vacuo, and the residue fractionated, the portion boiling at 178–184° C./1.14 mm. being collected as product.

Example 14

β-(2 - methyl - 3 - indolyl)propionitrile [II: Ar is 2-CH$_3$-3-indolyl; Y' is (CH$_2$)$_2$; n is 1] was prepared from 39.36 g. (0.3 mole) of 2-methylindole, 31.85 g. (0.60 mole) of acrylonitrile, 0.25 g. of boric acid, and 0.7 g. of cupric acetate using the manipulative procedure described above in Example 13. The crude material was purified by distillation in vacuo, and the fraction boiling at 159–167.0° C./0.25 mm. was collected as product. The latter was recrystallized from an ethyl acetate/hexane mixture giving 29.6 g. of β-(2-methyl-3-indolyl)propionitrile, M.P. 81–82° C. (uncorr.).

Example 15

β-[2-methyl-1-(2-cyanoethyl) - 3 - indolyl]propionitrile [II: Ar is 2-CH$_3$-3-indolyl; Y' is (CH$_2$)$_2$; (1- and 3-positions); n is 2].—To a slightly warm solution of 65.5 g. (0.50 mole) of 2-methylindole and 0.5 g. of powdered potassium hydroxide in 65 ml. of t-butyl alcohol was added dropwise, over a period of forty-five minutes, 29.2 g. (0.55 mole) of acrylonitrile while maintaining the temperature below 55° C. When addition was complete, the mixture was stirred for one half hour, then treated with 1.0 ml. of glacial acetic acid, diluted with ether, washed with water, and filtered to obtain 12.7 g. of crude product. The ether layer from the filtrate was separated, taken to dryness, and the residual oil distilled in vacuo up to 185° C./1.13 mm. The heel from the distillation was triturated with methanol to give 5.05 g. of product. Recrystallization from ethyl acetate of the 12.7 g. crop of crude product afforded an additional 4.50 g., thus giving a total yield of 9.55 g. of β-[2-methyl-1-(2-cyanoethyl)-3-indolyl]propionitrile, M.P. 148.5–150.0° C. (uncorr.).

Example 16

β-(7-aza-1-indolyl)propionitrile [II: Ar is 7-aza-1-indolyl; Y' is (CH$_2$)$_2$; n is 1].—To a solution of 31 g. (0.26 mole) of 7-azaindole and about 1 g. of powdered potassium hydroxide in 125 ml. of benzene was added 17 ml. of acrylonitrile. The mixture was stirred for three hours, diluted with ethyl acetate, washed with water, and the organic layer dried and taken to dryness giving 36.1 g. of a yellow oil which was distilled in vacuo. The fraction boiling at 101–102° C./0.08 mm. was collected giving 33.1 g. of β-(7-aza-1-indolyl)propionitrile. The free base, dissolved in dry ether, was treated with hydrogen chloride in conventional manner giving β-(7-aza-1-indolyl)propionitrile in the form of its hydrochloride salt, M.P. 151.0–152.0° C. (corr.).

By following the manipulative procedure described above in Examples 13–16, the following β-aryl-alkanonitriles of Formula II, where, in each case, Y' is (CH$_2$)$_2$ and n is 1 were prepared by reacting an aryl N-heterocyclic compound with acrylonitrile in the presence of a basic catalyst:

β-(3-ethyl-1-indolyl)propionitrile, B.P. 150° C./0.1 mm.;
β-(3-benzyl-1-indolyl)propionitrile, M.P. 83–85° C. (uncorr.) (recrystallized from ethanol); and
β-(1-indolinyl)propionitrile, M.P. 115–117° C./0.3 mm.

Examples 17–22

The following compounds of Formula II in Table 3 were prepared from an appropriate aromatic compound and acrylonitrile using the manipulative procedure described above in Example 16. The melting points are uncorrected.

TABLE 3

| Ex. | Ar | Y' | n | M.P./crystallized from— |
|---|---|---|---|---|
| 17 | 1-indolyl | CH$_2$CH$_2$ | 1 | 150.3–152.0° C./0.94 mm. |
| 18 | 2-CH$_3$-1-indolyl | CH$_2$CH$_2$ | 1 | 84–85° C., ethyl acetate/hexane. |
| 19 | 3-CH$_3$-1-indolyl | CH$_2$CH$_2$ | 1 | 84–88° C., ethanol. |
| 20 | 5-C$_6$H$_5$CH$_2$O-1-indolyl | CH$_2$CH$_2$ | 1 | 94–96° C., ethyl acetate/hexane. |
| 21 | 2-Cl-10-phenothiazinyl | CH$_2$CH$_2$ | 1 | 188.5–190° C., ethyl acetate. |
| 22 | 1-benzimidazolyl | CH$_2$CH$_2$ | 1 | 100–104° C. |

Example 23

β-(7-aza-3-indolyl)propionitrile [II: Ar is 7-aza-3-indolyl; Y' is (CH$_2$)$_2$; n is 1].—A solution of 44.5 g. (0.24 mole) of 3-dimethylaminomethyl-7-azaindole, 36 g. (0.24 mole) of hexamethylenetetramine, and 190 ml. of 66% propionic acid was filtered and added, over a period of one hour, to a refluxing solution of 36 g. (0.24 mole) of hexamethylenetetramine in 120 ml. of 66% propionic acid. The combined mixture was heated under reflux for two hours, diluted with 750 ml. of water, cooled, and after standing for three hours, the solid which had separated was collected, washed with water, and dried to give 17.2 g. of 7-aza-3-indolecarboxaldehyde, M.P. 214–217° C. (uncorr.).

The latter (0.118 mole) was dissolved in 600 ml. of ethanol along with 11.0 g. (0.13 mole) of cyanoacetic acid and 13.7 g. (0.16 mole) of piperidine and refluxed for forty minutes. The reaction mixture was taken to dryness, the residue dissolved in aqueous sodium bicarbonate-sodium hydroxide solution, extracted with ether, and acidified to pH 6 with acetic acid. The solid which separated was collected, washed with water, and dried giving 22.5 g. of β-(7-aza-3-indolyl)-α-cyanoacrylic acid, M.P. 250–255° C. (uncorr.).

The latter (0.105 mole) was dissolved in 300 ml. of a eutectic mixture of diphenyl and diphenyl oxide. One gram of copper chromite was added, and the mixture was heated under reflux for twenty minutes, filtered, cooled, and extracted with 1:3 hydrochloric acid. The acid extracts were washed with ether, charcoaled, basified with aqueous sodium hydroxide, and the solid which separated was collected and dried giving 10.2 g. of crude product, M.P. 225–240° C. (uncorr.). Recrystallization from acetonitrile afforded 5.1 g. of β-(7-aza-3-indolyl)acrylonitrile, M.P. 246–257° C. Further recrystallization from acetic acid/water gave 1.93 g. of material having M.P. 256–259° C. (uncorr.).

The latter (0.011 mole) was suspended in ethanol and reduced with hydrogen over a palladium-on-charcoal catalyst, reduction being complete in about twenty minutes. The reaction mixture was filtered, the solvent removed in vacuo, and the residue recrystallized twice from benzene giving 1.14 g. of β-(7-aza-3-indolyl)propionitrile, M.P. 170.0–172.0° C. (corr.).

Example 24

(4-chloro-3-indolyl)acetonitrile [II: Ar is 4-Cl-3-indolyl; Y' is CH$_2$; n is 1].—A solution of 10.7 g. (0.032 mole) of 4-chloro-3-dimethylaminomethylindole methyl methosulfate and 4.8 g. (0.08 mole) of sodium cyanide in 100 ml. of water was heated gently on a steam bath for one hour. After standing overnight, the aqueous mixture was saturated with sodium sulfate and extracted with methylene dichloride. The combined organic extracts were taken to dryness, and the residual yellow solid recrystallized twice from benzene giving 2.36 g. of (4-chloro-3-indolyl) acetonitrile, M.P. 132.6–134.6° C. (corr.).

Example 25

(2-methyl-7-aza-3-indolyl)acetonitrile [II: Ar is 2-$CH_3$-7-aza-3-indolyl; Y' is $CH_2$; $n$ is 1].—A mixture of 9 g. (0.05 mole) of 3-dimethylaminomethyl-2-methyl-7-azaindole and 11.2 (0.23 mole) of sodium cyanide in 11.3 ml. of water was treated dropwise with stirring and warming with 18.9 ml. of concentrated hydrochloric acid. The mixture was warmed for six hours, cooled, and the pale yellow solid which had separated was collected, dried, and recrystallized from ethanol 11.1 g. of (2-methyl-7-aza-3-indolyl)acetonitrile, M.P. 200.8–204.2° C. (corr.).

Example 26

(7-aza-3-indolyl)acetonitrile [II: Ar is 7-aza-3-indolyl; Y' is $CH_2$; $n$ is 1] was prepared from 5.25 g. (0.03 mole) of 3-dimethylaminomethyl-7-azaindole, 7.38 g. (0.15 mole) of sodium cyanide, 12.5 ml. (0.15 mole) of concentrated hydro chloric acid, and 750 ml. of water using the manipulative procedure described above in Example 25. The crude product was recrystallized from benzene giving 0.54 g. of (7-aza-3-indolyl)acetonitrile, M.P. 141.4–142.6° C. (corr.).

Example 27

(2-benzimidazolyl)acetonitrile [II: Ar is 2-benzimidazolyl; Y' is $CH_2$; $n$ is 1].—A mixture of 25 g. (0.23 mole of o-phenylenediamine and 40 g. (0.35 mole) of ethyl cyanoacetate was heated at 180–183° C. for thirty minutes, cooled, washed with ether, and the ether-insoluble material was collected and recrystallized from water giving 9.5 g. of (2-benzimidazolyl)acetonitrile, M.P. 206–209° C. (uncorr.).

Example 28

(3-cyano-7-azaindole) [II: Ar is 7-aza-3-indolyl; Y' is single bond; $n$ is 1].—A mixture of 16.8 g. (0.115 mole) of 7-aza-3-indolecarboxaldehyde, 20.0 g. (0.29 mole) of hydroxylamine hydrochloride, and 29.0 g. (0.29 mole) of sodium acetate trihydrate in 140 ml. of acetic acid was refluxed with stirring overnight, cooled, filtered, and the filtrate taken to dryness. The residue was slurried with water, filtered, and dried giving 11.8 g. of 3-cyano-7-azaindole, M.P. 249–252° C. (uncorr.).

Example 29

(1-methyl-7-aza-3-indolyl)acetonitrile [II: Ar is 1-$CH_3$-7-aza-3-indolyl; Y' is $CH_2$; $n$ is 1].—A suspension of 9.5 g. (0.21 mole) of sodium hydride in 500 ml. of dimethylformamide was treated with 31.4 g. (0.02 mole) of (7-aza-3-indolyl)acetonitrile. When hydrogen evolution had ceased, the mixture was treated with 13.1 ml. (0.2 mole) of methyl iodide dissolved in a small amount of dimethylformamide over a period of about ten minutes. The reaction mixture was allowed to stand at room temperature for one week, diluted with 300 ml. of water and extracted with ether. The combined extracts were taken to dryness and the residue recrystallized from hexane giving 10 g. of (1-methyl-7-aza-3-indolyl)acetonitrile, M.P. 81–82.5° C. (uncorr.).

Example 30

(1-benzyl-7-aza-3-indolyl)acetonitrile [(II: Ar is 1-$C_6H_5CH_2$-7-aza-3-indolyl; Y' is $CH_2$; $n$ is 1] was prepared from 31.4 g. (0.20 mole) of (7-aza-3-indolyl) acetonitrile, 9.5 g. (0.21 mole) of sodium hydride and 25.3 g. (0.20 mole) of benzyl chloride in 500 ml. of dimethylformamide using the manipulative procedure described above in Example 29. The crude product was purified by chromatographing in ether on a column of 400 g. of activated magnesium silicate. The first liter of eluate was discarded, the second liter was taken to dryness, and the residue from the latter recrystallized twice from benzene/hexane giving 14 g. of (1-benzyl-7-aza-3-indolyl)acetonitrile, M.P. 74.5–76° C. (uncorr.).

Example 31

(4-chloro-2-cyanoindole) [II: Ar is 4-Cl-2-indolyl; Y' is single bond; $n$ is 1].—A mixture of 10.0 g. (0.052 mole) of 4-chloro-2-indolecarboxamide and 50 ml. of phosphorus oxychloride was heated under reflux for thirty minutes until homogeneous, then cooled and poured into a mixture of 400 g. of ice and 100 ml. of ammonium hydroxide. The mixture was rendered basic by addition of more ammonium hydroxide, cooled, and the solid which separated was collected and dried. Recrystallization of the crude product from benzene gave 5.3 g. of 4-chloro-2-cyanoindole, M.P. 167.4–168.8° C. (corr.).

In similar manner, α-(3-propyl-1-indolyl)acetonitrile was prepared by dehydration of α-(3-propyl-1-indolyl) acetamide with benzene sulfonyl chloride and pyridine.

α-(3-dimethylaminomethyl-1-indolyl)acetonitrile was obtained as an oil by reaction of α-(1-indolyl)acetonitrile with dimethylamine and formaldehyde in acetic acid.

Examples 32–60

By following one of the appropriate procedures given in Examples 1–31, using the appropriate starting materials, there can be obtained the compounds of Formula II listed below in Table 4, where $n$ in each case is 1.

TABLE 4

| Ex. | Ar | Y' |
| --- | --- | --- |
| 32 | 2-Br-5-(dibenzo[a,d][1,4]cycloheptadienylidenyl) | $(CH_2)_5$ |
| 33 | 6-F-2-indolyl | $(CH_2)_2$ |
| 34 | 6-I-2-aza-1-indolyl | $(CH_2)_2$ |
| 35 | 6-$CF_3$-2-aza-3-indolyl | $CH(CH_3)$ |
| 36 | 3-CH=NOH-4-aza-1-indolyl | $(CH_2)_3$ |
| 37 | 3-$CH_2N(CH_3)_2$-5-aza-1-indolyl | $(CH_2)_2$ |
| 38 | 6-aza-1-indolyl | $CH(CH_3)CH_2$ |
| 39 | 4-aza-2-indolyl | $(CH_2)_2$ |
| 40 | 5-aza-2-indolyl | $(CH_2)_2$ |
| 41 | 6-aza-2-indolyl | $(CH_2)_2$ |
| 42 | 7-aza-2-indolyl | $(CH_2)_2$ |
| 43 | 4-aza-3-indolyl | $(CH_2)_2$ |
| 44 | 5-aza-3-indolyl | $(CH_2)_2$ |
| 45 | 6-aza-3-indolyl | $(CH_2)_3$ |
| 46 | 2-pyrrolyl | $CH(CH_3)CH_2$ |
| 47 | 3-pyrrolyl | $(CH_2)_2$ |
| 48 | 1-pyrazolyl | $(CH_2)_2$ |
| 49 | 3-pyrazolyl | $(CH_2)_2$ |
| 50 | 4-pyrazolyl | $(CH_2)_2$ |
| 51 | 1-imidazolyl | $(CH_2)_2$ |
| 52 | 2-imidazolyl | $(CH_2)_2$ |
| 53 | 4-imidazolyl | $(CH_2)_3$ |
| 54 | 6-$CH_3$S-1-[1H-benzotriazolyl] | $(CH_2)_3$ |
| 55 | 6-$CH_3$SO-2-[2H-benzotriazolyl] | $(CH_2)_3$ |
| 56 | 3-$CH_3SO_2$-5-(10,11-dihydro-5H-dibenzo[b,f]azepinyl) | $(CH_2)_2$ |
| 57 | 6-F-1-benzimidazolyl | $(CH_2)_2$ |
| 58 | 6-$CF_2$-2-benzimidazolyl | $(CH_2)_2$ |
| 59 | 1-pyrrolyl | $(CH_2)_2$ |
| 60 | 3-(pyrido-[2,1-c]-s-triazolyl) | $(CH_2)_3$ |

Example 61

2-(2-methyl-7-aza-3-indolyl)ethylamine dihydrochloride [IV: Ar is 2-$CH_3$-7-aza-3-indolyl; Y is $(CH_2)_2$; $n$ is 1].—Three grams (0.18 mole) of (2-methyl-7-aza-3-indolyl)acetonitrile were added to about 125 ml. of absolute ethanol containing 15 ml. of concentrated hydrochloric acid. The mixture was reduced with hydrogen over 1.0 g. of platinum oxide catalyst at an initial pressure of 47 pounds p.s.i., reduction being complete in about an hour. The catalyst was removed by filtration, the filtrate was taken to dryness in vacuo, and the residual solid was recrystallized from isopropyl alcohol giving 35 g. of 2-(2-methyl-7-aza-3-indolyl)ethylamine dihydrochloride, M.P. 286–309° C° (uncorr.).

Example 62

2-(7-aza-3-indolyl)ethylamine [IV: Ar is 7-aza-3-indolyl; Y is $(CH_2)_2$; $n$ is 1] was prepared from 21.6 g. (0.14 mole) of (7-aza-3-indolyl)acetonitrile in 40 ml. of methanol using a Raney nickel catalyst and a hydrogen pressure of about 1,100 pounds p.s.i. using the manipulative procedure described above in Example 61. There was thus obtained 18 g. of 2-(7-aza-3-indolyl)ethylamine, M.P. 124–133° C. (uncorr.).

Examples 63–112

By following the manipulative procedure described above in Example 61, using an appropriate aryl-alkanonitrile, there can be obtained the compounds of Formula IV listed below in Table 5.

TABLE 5

| Ex. | Ar | Y | $n$ |
|---|---|---|---|
| 63 | 7-aza-1-indolyl | $(CH_2)_2$ | 1 |
| 64 | 1,3-(7-azaindolyl) | $(CH_2)_2$ | 2 |
| 65 | 1-indolyl | $(CH_2)_2$ | 1 |
| 66 | 3-$CH_3$-1-indolyl | $(CH_2)_2$ | 1 |
| 67 | 2-Cl-10-phenothiazinyl | $(CH_2)_2$ | 1 |
| 68 | 1-benzimidazolyl | $(CH_2)_2$ | 1 |
| 69 | 1,3-(7-azaindolyl) | (3-)$(CH_2)_3$ / (1-)$(CH_2)_3$ | 2 |
| 70 | 2-$CH_3$-3-indolyl | $(CH_2)_5$ | 1 |
| 71 | 5,6-$OCH_2O$-3-indolyl | $(CH_2)_2$ | 1 |
| 72 | 5,6-di-$CH_3O$-3-indolyl | $(CH_2)_2$ | 1 |
| 73 | 2-$CH_3$-1,3-indolyl | $(CH_2)_3$ | 2 |
| 74 | 7-aza-1-indolyl | $(CH_2)_3$ | 1 |
| 75 | 2-$CH_3$-1-indolyl | $(CH_2)_3$ | 1 |
| 76 | 3-$CH_3$-1-indolyl | $(CH_2)_3$ | 1 |
| 77 | 5-$C_6H_5CH_2O$-1-indolyl | $(CH_2)_3$ | 1 |
| 78 | 4-Cl-3-indolyl | $(CH_2)_2$ | 1 |
| 79 | 2-$CH_3$-7-aza-3-indolyl | $(CH_2)_3$ | 1 |
| 80 | 7-aza-3-indolyl | $CH_2$ | 1 |
| 81 | 1-$CH_3$-7-aza-3-indolyl | $(CH_2)_2$ | 1 |
| 82 | 1-$C_6H_5CH_2$-7-aza-3-indolyl | $(CH_2)_2$ | 1 |
| 83 | 4-Cl-2-indolyl | $CH_2$ | 1 |
| 84 | 2-Br-5-(dibenzo[a,d][1,4]-cycloheptadienylidenyl) | $(CH_2)_6$ | 1 |
| 85 | 6-F-2-indolyl | $(CH_2)_3$ | 1 |
| 86 | 6-I-2-aza-1-indolyl | $(CH_2)_3$ | 1 |
| 87 | 6-$CF_3$-2-aza-3-indolyl | $CH(CH_3)CH_2$ | 1 |
| 88 | 3-CH=NOH-4-aza-1-indolyl | $(CH_2)_4$ | 1 |
| 89 | 3-$CH_2N(CH_3)_2$-5-aza-1-indolyl | $(CH_2)_3$ | 1 |
| 90 | 6-aza-1-indolyl | $CH(CH_3)CH_2CH_2$ | 1 |
| 91 | 4-aza-2-indolyl | $(CH_2)_3$ | 1 |
| 92 | 5-aza-2-indolyl | $(CH_2)_3$ | 1 |
| 93 | 6-aza-2-indolyl | $(CH_2)_3$ | 1 |
| 94 | 7-aza-2-indolyl | $(CH_2)_3$ | 1 |
| 95 | 4-aza-3-indolyl | $(CH_2)_3$ | 1 |
| 96 | 5-aza-3-indolyl | $(CH_2)_3$ | 1 |

TABLE 5—(Continued)

| Ex. | Ar | Y | $n$ |
|---|---|---|---|
| 97 | 6-aza-3-indolyl | $(CH_2)_4$ | 1 |
| 98 | 2-pyrrolyl | $CH(CH_3)CH_2CH_2$ | 1 |
| 99 | 3-pyrrolyl | $(CH_2)_3$ | 1 |
| 100 | 1-pyrazolyl | $(CH_2)_3$ | 1 |
| 101 | 3-pyrazolyl | $(CH_2)_3$ | 1 |
| 102 | 4-pyrazolyl | $(CH_2)_3$ | 1 |
| 103 | 1-imidazolyl | $(CH_2)_3$ | 1 |
| 104 | 2-imidazolyl | $(CH_2)_3$ | 1 |
| 105 | 4-imidazolyl | $(CH_2)_4$ | 1 |
| 106 | 6-$CH_3S$-1-[1H-benzotriazolyl] | $(CH_2)_3$ | 1 |
| 107 | 6-$CH_3SO_2$-[2H-benzotriazolyl] | $(CH_2)_3$ | 1 |
| 108 | 3-$CH_3SO_2$-5-(10,11-dihydro-5H-dibenzo[b,f]azepinyl) | $(CH_2)_3$ | 1 |
| 109 | 6-F-1-benzimidazolyl | $(CH_2)_3$ | 1 |
| 110 | 6-$CF_3$-2-benzimidazolyl | $(CH_2)_3$ | 1 |
| 111 | 1-pyrrolyl | $(CH_2)_3$ | 1 |
| 112 | 3-(pyrido-[2,1-c]s-triazolyl) | $(CH_2)_4$ | 1 |

PREPARATION OF THE FINAL PRODUCTS

Example 113

$\beta$-(7-aza-3-indolyl)propionamidoxime dihydrochloride [Ia: $R_1$, $R_2$, and $R_3$ are H; Ar is 7-aza-3-indolyl; Y' is $(CH_2)_2$; $n$ is 1].—A solution of 15.3 g. (0.09 mole) of $\beta$-(7-aza-3-indolyl)propionitrile, 12.4 g. (0.179 mole) of hydroxylamine hydrochloride, 38 g. (0.36 mole) of anhydrous sodium carbonate and 1,500 ml. of ethanol was refluxed and stirred overnight. The hot mixture was filtered, the filtrate taken to dryness, and the thick oily residue suspended in ethyl acetate, washed with water and aqueous sodium chloride, dried, and taken to dryness. The residue was dissolved in absolute ethanol, the solution was acidified with alcoholic hydrogen chloride and the solid, which separated on cooling, was collected, dried, and recrystallized from ethanol giving 3.5 g. of $\beta$-(7-aza-3-indolyl)propionamidoxime dihydrochloride, M.P. 238.5–239.0° C. (corr.).

Examples 114–140

The following compounds of Formula Ia ($R_1$, $R_2$, and $R_3$ are H) listed in Table 6 below were prepared from an appropriate aryl-alkanonitrile and hydroxylamine using the procedure described above in Example 113. The melting points are corrected.

TABLE 6

| Example | Ar | Y' | $n$ | M.P./crystallized from— |
|---|---|---|---|---|
| 114 | 2-$CH_3$-7-aza-3-indolyl | $CH_2$ | 1 | 219.2–220.8° C., ethanol. |
| 115 | 7-aza-3-indolyl | | 1 | 175.4–176.0° C., ethanol. |
| 116 | 7-aza-1-indolyl | $CH_2$ | 1 | 181.0–181.6° C., ethanol. |
| 117 | 7-aza-1-indolyl | $(CH_2)_2$ | 1 | 129.5–131.5° C., ethyl acetate. |
| 118 | 1-$CH_3$-7-aza-3-indolyl | $CH_2$ | 1 | 175.0–185.0° C., isopropanol/water. |
| 119[1] | 1-$C_6H_5CH_2$-7-aza-3-indolyl | $CH_2$ | 1 | 206.8–207.0° C., isopropanol/water. |
| 120 | 1,3-(7-azaindolyl) | $CH_2$ | 2 | 203.0–204.8° C., dimethylformamide/water. |
| 121 | 7-aza-3-indolyl | $CH_2$ | 1 | 162.0–163.4° C., water. |
| 122 | 3-indolyl | $CH_2$ | 1 | 128.2–134.0° C., ethyl acetate/hexane. |
| 123[2] | 3-indolyl | $(CH_2)_2$ | 1 | 169.8–170.4° C., ethanol/ether. |
| 124 | 2-$CH_3$-3-indolyl | $(CH_2)_2$ | 1 | 175.2–177.8° C., ethyl acetate. |
| 125 | 5,6-$OCH_2O$-3-indolyl | $CH_2$ | 1 | 183.8–184.6° C., ethanol. |
| 126 | 5,6-di-$CH_3O$-3-indolyl | $CH_2$ | 1 | 187.4–188.0° C., ethanol. |
| 127 | 1-indolyl | $CH_2$ | 1 | 138.5–139.5° C., ethanol/water. |
| 128 | 3-$CH_3$-1-indolyl | $CH_2$ | 1 | 134.2–135.6° C., ethyl acetate. |
| 129 | 1-indolyl | $(CH_2)_2$ | 1 | 107.6–111.6° C., ethyl acetate/hexane |
| 130 | 2-$CH_3$-1-indolyl | $(CH_2)_2$ | 1 | 87.8–95.0° C., ethyl acetate/hexane. |
| 131 | 3-$CH_3$-1-indolyl | $(CH_2)_2$ | 1 | 105.8–107.2° C., benzene. |
| 132 | 5-$C_6H_5CH_2O$-1-indolyl | $(CH_2)_2$ | 1 | 166.0–167.6° C., ethyl acetate. |
| 133 | 2-$CH_3$-1,3-indolyl | $(CH_2)_2$ | 2 | 184.0–185.6° C., ethanol. |
| 134 | 1,3-indolyl | (1-)$CH_2$ / (3-)$(CH_2)_2$ | 2 | 152.4–152.7° C., ethanol. |
| 135 | 1-pyrrolyl | $(CH_2)_2$ | 1 | 90.0–91.6° C., benzene/hexane. |
| 136 | 2-Cl-10-phenothiazinyl | $(CH_2)_2$ | 1 | 147.8–149.0° C., benzene. |
| 137 | 2-Cl-10-phenothiazinyl | $CH_2$ | 1 | 193.0–194.6° C., ethanol. |
| 138 | 1-benzimidazolyl | $(CH_2)_2$ | 1 | 182.8–183.8° C., ethanol. |
| 139 | 1-benzimidazolyl | $CH_2$ | 1 | 219.0–219.5° C., ethanol. |
| 140 | 2-benzimidazolyl | $CH_2$ | 1 | 197.0–199.0° C., ethanol. |

[1] Hydrochloride salt.
[2] p-Toluenesulfonate salt.

By following the manipulative procedure described above in Example 113, the following compounds of Formula Ia, where $R_1$, $R_2$, and $R_3$ in each case is H, and $n$ in each case is 1, were prepared by reacting the corresponding aryl-alkanonitrile with hydroxylamine:

α-(3-chloro-1-indolyl)acetamidoxime sulfate, M.P., 150.0–151.0° C. (corr.) (recrystallized from an ethanol-ethyl acetate mixture);

α-(3-bromo-1-indolyl)acetamidoxime, M.P. 136.8–139.8° C. (corr.) (recrystallized from a tetrahydrofuran-ethyl acetate mixture);

α-(3 - methyl-1-indolyl)propionamidoxime hydrochloride, M.P. 165.2–168.2° C. (corr.) (recrystallized from tetrahydrofuran and washed with ether);

α-(7 - methyl - 1 - indolyl)acetamidoxime sulfate, M.P. 151.6–153.0° C. (corr.) (recrystallized from an ethanol-ethyl acetate mixture);

α-(3-ethyl-1-indolyl)acetamidoxime hydrochloride, M.P. 158.0–159.0° C. (corr.) (recrystallized from ethyl acetate);

β-(3 - ethyl - 1 - indolyl)propionamidoxime sulfate, M.P. 178.0–178.6° C. (corr.) (recrystallized from an ethanol-isopropanol mixture);

α-(3-propyl-1-indolyl)acetamidoxime sulfate, M.P. 146.0–148.0° C. (corr.) (recrystallized from isopropanol);

α-(3-butyl-1-indolyl)acetamidoxime hydrochloride, M.P. 162.0–164.0° C. (corr.) (recrystallized from ethyl acetate);

α-(2,5 - dimethyl-3-propyl-1-indolyl)acetamidoxime, M.P. 140.0–141.0° C. (corr.) (recrystallized from ethanol);

α-(5 - methoxy - 1 - indolyl)acetamidoxime, M.P. 150.0–152.0° C. (corr.) (recrystallized from a tetrahydrofuran-hexane mixture);

α-(3-acetyl-1-indolyl)acetamidoxime, M.P. 209.0–210.0° C. (corr.) (precipitated from dimethylformamide by dilution with water, collected and washed with isopropanol);

α-(3-propionyl - 1 - indolyl)acetamidoxime, M.P. 208.0–209.8° C. (corr.) (recrystallized from tetrahydrofuran);

α-(3-butyryl-1-indolyl)acetamidoxime, M.P. 199.0–199.6° C. (corr.) (recrystallized from tetrahydrofuran);

α-(3-benzyl-1-indolyl)acetamidoxime, M.P. 118.0–120.0° C. (corr.) (recrystallized from an ether-hexane mixture);

β-(3-benzyl - 1 - indolyl)propionamidoxime sulfate, M.P. 169.6–170.8° C. (corr.) (recrystallized from ethanol);

α-(3 - dimethylaminomethyl - 1 - indolyl)acetamidoxime, M.P. 148.2–150.0° C. (corr.) (recrystallized from ethyl acetate);

β-(1-indolinyl)propionamidoxime dihydrochloride, M.P. 177.4–182.0° C. (corr.) (recrystallized from ethanol);

γ-[5-(10,11 - dihydro - 5H - dibenz[b,f]azepinyl)]butyramidoxime p-toluenesulfonate, M.P. 187.8–188.0° C. (corr.) (recrystallized from a methanol-ether mixture);

α-[9-(1,2,3,4 - tetrahydrocarbazolyl)]acetamidoxime hydrochloride, M.P. 168.0–169.0° C. (corr.) (recrystallized from an ethanol-tetrahydrofuran-ether mixture);

α-[1 - (1H - benzotriazolyl)]acetamidoxime, M.P. 207.6–208.0° C. (corr.) (recrystallized from methanol); and α-[2 - (2H - benzotriazolyl)]acetamidoxime, M.P. 170.0–179.0° C. (corr.) (recrystallized from ethyl acetate).

Example 141

(7-aza-3-indolyl)acetamidoxime O-acetate [Ia: $R_1$ and $R_2$ are H; $R_3$ is $CH_3CO$; Ar is 7-aza-3-indolyl; Y' is $CH_2$; $n$ is 1].—A solution of 19.0 g. (0.1 mole) of (7-aza-3-indolyl)acetamidoxime, 150 ml. of pyridine, and 10 ml. of acetic anhydride was heated at 65° C. on a water bath for ten minutes, and taken to dryness in vacuo. Water was added to the reaction mixture, and again the mixture was taken to dryness. The residue was slurried with water, filtered, dried, and recrystallized from isopropanol giving 15 g. of (7-aza-3-indolyl)acetamidoxime O-actate, M.P. 171.6–172.6° C. (corr.).

By following the manipulative procedure described above in Example 141, the following compounds of Formula Ia, where in each case $R_1$ and $R_2$ are H, $R_3$ is $CH_3CO$, Y' is $CH_2$ and $n$ is 1, were prepared by reacting the appropriate α-(1-indolyl)acetamidoxime with acetic anhydride in the presence of pyridine:

α-(1-indolyl)acetamidoxime O-acetate, M.P. 118.0–121.0° C. (corr.) (recrystallized from an ethyl acetate-hexane mixture);

α-(3 - ethyl - 1 - indolyl)acetamidoxime O-acetate, M.P. 149.0–151.0° C. (corr.) (recrystallized from an ethyl acetate-hexane mixture); and α-(3-benzyl - 1 - indolyl)acetamidoxime O-acetate, M.P. 168.0–196.6° C. (corr.) (recrystallized from an ethyl acetate-hexane mixture).

Example 142

(7-aza - 3 - indolyl)acetamidoxime O-benzoate [Ia: $R_1$ and $R_2$ are H; $R_3$ is $C_6H_5CO$; Ar is 7-aza-3-indolyl; Y' is $CH_2$; $n$ is 1].—To a solution of 15 g. (0.08 mole) of (7-aza-3-indolyl)acetamidoxime in 100 ml. of pyridine was added, in small portions, 11.2 g. (0.08 mole) of benzoyl chloride while maintaining the temperature below 35° C. After standing overnight, the solution was poured into 700 ml. of water and the gray precipitate that separated was collected, dried, and recrystallized from ethanol giving 11.4 g. of (7-aza-3-indolyl)acetamidoxime O-benzoate, M.P. 176.6–178.4° C. (corr.).

By following the manipulative procedure described above in Example 142, the following compounds of Formula Ia, where in each case $R_1$ and $R_2$ are hydrogen, Y' is $CH_2$, and $n$ is 1, were prepared by reacting the appropriate α-(1-indolyl)acetamidoxime with an appropriate benzoyl chloride in the presence of pyridine:

α - (1 - indolyl)acetamidoxime O - benzoate, M.P. 173.0–173.5° C. (corr.) (recrystallized from acetone);

α-(3-methyl - 1 - indolyl)acetamidoxime O-benzoate, M.P. 178.0–180.0° C. (corr.) (recrystallized from tetrahydrofuran);

α-(1-indolyl)acetamidoxime O-(3,4,5 - trimethoxybenzoate), M.P. 154.0–155.0° C. (corr.) (recrystallized from an ethyl acetate-hexane mixture);

α-(3-methyl - 1 - indolyl)acetamidoxime O-(3,4,5-trimethoxybenzoate), M.P. 171.8–173.8° C. (corr.) (recrystallized from ethyl acetate); and α-(3-ethyl-1-indolyl)acetamidoxime O-(3,4,5-trimethoxybenzoate), M.P. 164.0–165.8° C. (corr.) (recrystallized from an ethyl acetate-hexane mixture).

By replacing the benzoyl chloride in the foregoing preparation by p-toluyl chloride, p-chlorobenzoyl chloride or 3-methoxybenzoyl chloride, there can be obtained the corresponding O-(p-toluate), O-(p-chlorobenzoate), or O-(3-methoxybenzoate), respectively, of (7-aza-3-indolyl) acetamidoxime.

Examples 143–176

By reacting an appropriate aryl-alkanonitrile with hydroxylamine using the manipulative procedure described above in Example 113, there can be obtained the compounds of Formula Ia ($R_1$, $R_2$, and $R_3$ are H) listed below in Table 7, where $n$ in each case is 1.

TABLE 7

| Ex. | Ar | Y' |
|---|---|---|
| 143 | 2-Br-5-(dibenzo[a,d][1,4]cycloheptadienylidenyl) | $(CH_2)_5$ |
| 144 | 6-F-2-indolyl | $(CH_2)_2$ |
| 145 | 6-I-2-aza-1-indolyl | $(CH_2)_2$ |
| 146 | 6-$CF_3$-2-aza-3-indolyl | $CH(CH_3)$ |
| 147 | 3-CH=NOH-4-aza-1-indolyl | $(CH_2)_3$ |
| 148 | 3-$CH_2N(CH_3)_2$-5-aza-1-indolyl | $(CH_2)_2$ |
| 149 | 6-aza-1-indolyl | $CH(CH_3)CH_2$ |
| 150 | 4-aza-2-indolyl | $(CH_2)_2$ |
| 151 | 5-aza-2-indolyl | $(CH_2)_2$ |
| 152 | 6-aza-2-indolyl | $(CH_2)_2$ |
| 153 | 7-aza-2-indolyl | $(CH_2)_2$ |
| 154 | 4-aza-3-indolyl | $(CH_2)_2$ |
| 155 | 5-aza-3-indolyl | $(CH_2)_2$ |

TABLE 7—(Continued)

| Ex. | Ar | Y' |
|---|---|---|
| 156 | 6-aza-3-indolyl | (CH$_2$)$_3$ |
| 157 | 2-pyrrolyl | CH(CH$_3$)CH$_2$ |
| 158 | 3-pyrrolyl | (CH$_2$)$_2$ |
| 159 | 1-pyrazolyl | (CH$_2$)$_2$ |
| 160 | 3-pyrazolyl | (CH$_2$)$_2$ |
| 161 | 4-pyrazolyl | (CH$_2$)$_2$ |
| 162 | 1-imidazolyl | (CH$_2$)$_2$ |
| 163 | 2-imidazolyl | (CH$_2$)$_2$ |
| 164 | 4-imidazolyl | (CH$_2$)$_3$ |
| 165 | 6-CH$_3$S-1-[1H-benzotriazolyl] | (CH$_2$)$_2$ |
| 166 | 6-CH$_3$SO-2-[2H-benzotriazolyl] | (CH$_2$)$_2$ |
| 167 | 3-CH$_3$SO$_2$-5-(10,11-dihydro-5H-dibenzo[b,f]-azepinyl) | (CH$_2$)$_2$ |
| 168 | 6-F-1-benzimidazolyl | (CH$_2$)$_2$ |
| 169 | 6-CF$_3$-2-benzimidazolyl | (CH$_2$)$_2$ |
| 170 | 1-pyrrolyl | (CH$_2$)$_2$ |
| 171 | 3-(pyrido-[2,1-c]-s-triazolyl) | (CH$_2$)$_3$ |
| 172 | 3-indolyl | (CH$_2$)$_4$ |
| 173 | 3-indolyl | (CH$_2$)$_5$ |
| 174 | 2-CH$_3$-3-indolyl | (CH$_2$)$_4$ |
| 175 | 4-Cl-3-indolyl | CH$_2$ |
| 176 | 4-Cl-2-indolyl | |

Example 177

(7-aza-3-indolyl)acetamidoxime O-benzyl ether [Ia: R$_1$ and R$_2$ are H; R$_3$ is C$_6$H$_5$CH$_2$; Ar is 7-aza-3-indolyl; Y' is CH$_2$; $n$ is 1].—By reacting (7-aza-3-indolyl)acetamidoxime with benzyl chloride, 4-methylmercaptobenzyl chloride, 4-methylsulfonylbenzyl chloride, or 4-trifluoromethylbenzyl chloride, in the presence of sodium hydroxide, there can be obtained, respectively, (7-aza-3-indoyl)acetamidoxime O-benzyl ether, O-(4-methylmercaptobenzyl)ether, O-(4-methylsulfonylbenzyl)ether, or O-(4-trifluoromethylbenzyl)ether.

Example 178

(7-aza-3-indolyl)acetamidoxime O-methyl ether [Ia: R$_1$ and R$_2$ are H; R$_3$ is CH$_3$; Ar is 7-aza-3-indolyl; Y' is CH$_2$; $n$ is 1].—By reacting (7-aza-3-indolyl)acetamidoxime with methyl iodide in the presence of sodium hydroxide, there can be obtained (7-aza-3-indolyl)acetamidoxime O-methyl ether.

Example 179

(7-aza-3-indolyl)-N,N-diethylacetamidoxime [Ia: R$_1$ and R$_2$ are C$_2$H$_5$; R$_3$ is H; Y' is CH$_2$; $n$ is 1].— By reacting the (7-aza-3-indolyl)acetamidoxime O-benzyl ether, described above in Example 177, with sodium nitrite in the presence of hydrochloric acid at a temperature from about 0° C. to 5° C., there can be obtained (7-aza-3-indolyl)acetohydrozamic chloride O-benzyl ether. By reacting the latter with diethylamine, there can be obtained (7 - aza - 3-indolyl)-N,N-diethylacetamidoxime O-benzyl ether.

By reducing the latter with hydrogen over a palladium-on-charcoal catalyst, there can be obtained (7-aza-3-indolyl)-N,N-diethylacetamidoxime.

Example 180

(7-aza-3-indolyl)acetohydroxamic acid oxime [Ia: R$_1$ is OH; R$_2$ and R$_3$ are H; Ar is 7-aza-3-indolyl; Y' is CH$_2$; $n$ is 1].—By reacting the (7-aza-3-indolyl)acetohydroxamic chloride O-benzyl ether described above in Example 179 with hydroxylamine, there can be obtained (7 - aza - 3-indolyl)-N-hydroxyacetamidoxine O-benzyl ether. By reducing the latter with hydrogen over a palladium-on-charcoal catalyst, there can be obtained (7-aza-3-indolyl)-N-hydroxyacetamidoxime.

Similarly, by replacing the hydroxylamine by N-methylhydroxylamine, there can be obtained (7-aza-3-indolyl)-N-hydroxy-N-methylacetamidoxime.

Example 181

(7-aza-3-indolyl)-α-hydroxyacetamidoxime [Ia: R$_1$, R$_2$, and R$_3$ are H; Ar is 7-aza-3-indolyl; Y is CHOH; $n$ is 1].—By reacting (7-aza-3-indole)carboxaldehyde with hydrogen cyanide, and reacting the resulting aldehyde cyanohydrin with hydroxylamine using the manipulative procedure described above in Example 113, there can be obtained (7-aza-3-indolyl)-α-hydroxyacetamidoxime.

Example 182

(7 - aza - 3 - indolyl) - N - acetylacetamidoxime O-acetate [Ia: R$_1$ and R$_3$ are CH$_3$CO; R$_2$ is H; Ar is 7-aza-3-indolyl; Y' is CH$_2$; $n$ is 1].—By reacting (7-aza-3-indolyl)acetamidoxime with acetic anhydride in the presence of pyridine, using the manipulative procedure described above in Example 141, there can be obtained (7-aza-3-indolyl)-N-acetylacetamidoxime O-acetate.

Example 183

(7-aza-3-indolyl)acetamidine hydrochloride [Ib: Ar is 7-aza-3-indolyl; Y' is CH$_2$; $n$ is 1].—Anhydrous hydrogen chloride was bubbled through a mixture of 3.1 g. (0.02 mole) of (7-aza-3-indolyl)acetonitrile, 2.0 ml. of ethanol, and 50 ml. of chloroform for about three hours while maintaining the temperature around 0° C. and protecting the mixture from atmospheric moisture. The mixture was taken to dryness in vacuo, and treated, while cooling, with a solution of 10 ml. of liquid ammonia in ethanol. The milky suspension was then stirred at room temperature for three hours, filtered, and the filtrate charcoaled and taken to dryness. The residual gum was crystallized several times from ethanol giving 1.84 g. of (7-aza-3-indolyl)acetamidine hydrochloride, M.P. 254.0–256.4° C. (corr.).

Examples 184–233

By treating an appropriate aryl-alkanonitrile with anhydrous ethanolic hydrogen chloride, followed by treatment of the resulting imidate ester with alcoholic ammonia using the manipulative procedure described above in Example 183, there can be obtained the compounds of Formula Ib listed below in Table 8.

TABLE 8

| Ex. | Ar | Y' | n |
|---|---|---|---|
| 184 | 7-aza-1-indolyl | CH$_2$ | 1 |
| 185 | 1,3-(7-azaindolyl) | CH$_2$ | 2 |
| 186 | 1-indolyl | CH$_2$ | 1 |
| 187 | 3-CH$_3$-1-indolyl | CH$_2$ | 1 |
| 188 | 2-Cl-10-phenolthiazinyl | CH$_2$ | 1 |
| 189 | 1-benzimidazolyl | CH$_2$ | 1 |
| 190 | 1,3-(7-azindolyl) | (3-)(CH$_2$)$_2$ / (1-) CH$_2$ | 2 |
| 191 | 2-CH$_3$-3-indolyl | (CH$_2$)$_4$ | 1 |
| 192 | 5,6-OCH$_2$O-3-indolyl | CH$_2$ | 1 |
| 193 | 5,6-di-CH$_3$O-3-indolyl | CH$_2$ | 1 |
| 194 | 2-CH$_3$-1,3-indolyl | (CH$_2$)$_2$ | 2 |
| 195 | 7-aza-1-indolyl | (CH$_2$)$_2$ | 1 |
| 196 | 2-CH$_3$-1-indolyl | (CH$_2$)$_2$ | 1 |
| 197 | 3-CH$_3$-1-indolyl | (CH$_2$)$_2$ | 1 |
| 198 | 5-C$_6$H$_5$CH$_2$O-1-indolyl | (CH$_2$)$_2$ | 1 |
| 199 | 4-Cl-3-indolyl | CH$_2$ | 1 |
| 200 | 2-CH$_3$-7-aza-3-indolyl | CH$_2$ | 1 |
| 201 | 7-aza-3-indolyl | | 1 |
| 202 | 1-CH$_3$-7-aza-3-indolyl | CH$_2$ | 1 |
| 203 | 1-C$_6$H$_7$CH$_2$-7-aza-3-indolyl | CH$_2$ | 1 |
| 204 | 4-Cl-2-indolyl | | 1 |
| 205 | 2-Br-5-(dibenzo[a,d][1,4]-cycloheptadienyl-idenyl) | (CH$_2$)$_5$ | 1 |
| 206 | 6-F-2-indolyl | (CH$_2$)$_2$ | 1 |
| 207 | 6-I-2-aza-1-indolyl | (CH$_2$)$_2$ | 1 |
| 208 | 6-CF$_3$-2-aza-3-indolyl | CH(CH$_3$) | 1 |
| 209 | 3-CH=NOH-4-aza-1-indolyl | (CH$_2$)$_3$ | 1 |
| 210 | 3-CH$_2$N(CH$_3$)$_2$-5-aza-1-indolyl | (CH$_2$)$_2$ | 1 |
| 211 | 6-aza-1-indolyl | CH(CH$_3$)CH$_2$ | 1 |
| 212 | 4-aza-2-indolyl | (CH$_2$)$_2$ | 1 |
| 213 | 5-aza-2-indolyl | (CH$_2$)$_2$ | 1 |
| 214 | 6-aza-2-indolyl | (CH$_2$)$_2$ | 1 |
| 215 | 7-aza-2-indolyl | (CH$_2$)$_2$ | 1 |
| 216 | 4-aza-3-indolyl | (CH$_2$)$_2$ | 1 |
| 217 | 5-aza-3-indolyl | (CH$_2$)$_2$ | 1 |
| 218 | 6-aza-3-indolyl | (CH$_2$)$_3$ | 1 |
| 219 | 2-pyrrolyl | CH(CH$_3$)CH$_2$ | 1 |
| 220 | 3-pyrrolyl | (CH$_2$)$_2$ | 1 |
| 221 | 1-pyrazolyl | (CH$_2$)$_2$ | 1 |
| 222 | 3-pyrazolyl | (CH$_2$)$_2$ | 1 |
| 223 | 4-pyrazolyl | (CH$_2$)$_2$ | 1 |
| 224 | 1-imidazolyl | (CH$_2$)$_2$ | 1 |
| 225 | 2-imidazolyl | (CH$_2$)$_2$ | 1 |
| 226 | 4-imidazolyl | (CH$_2$)$_3$ | 1 |
| 227 | 6-CH$_3$S-1-[1H-benzotriazolyl] | (CH$_2$)$_2$ | 1 |
| 228 | 6-CH$_3$SO-2-[2H-benzotriazolyl] | (CH$_2$)$_2$ | 1 |
| 229 | 3-CH$_3$SO$_2$-5-(10,11-dihydro-5H-dibenzo-[b,f]azepinyl) | (CH$_2$)$_2$ | 1 |
| 230 | 6-F-1-benzimidazolyl | (CH$_2$)$_2$ | 1 |
| 231 | 6-CF$_3$-2-benzimidazolyl | (CH$_2$)$_2$ | 1 |
| 232 | 1-pyrrolyl | (CH$_2$)$_2$ | 1 |
| 233 | 3-(pyrido-[2,1-c]-s-triazolyl) | (CH$_2$)$_3$ | 1 |

Example 234

2-(2-methyl-7-aza-3-indoyl)ethylguanidine hydrobromide [Ic: Ar is 2-CH$_3$-7-aza-3-indoyl; Y is (CH$_2$)$_2$; $n$ is 1].—A mixture of 2.20 g. (0.013 mole) of 2-(2-methyl-7-aza-3-indoyl)ethylamine and 3.47 g. (0.138 mole) of ethyl isothiouronium bromide (prepared from thiourea and ethyl bromide) in 7 ml. of water was refluxed for six hours, cooled, taken to dryness, and the residue recrystallized once from isopropyl alcohol and once from methanol/ether giving 0.54 g. of 2-(2-methyl-7-aza-3-indoyl)ethylguanidine hydrobromide, M.P. 244.8–246.2° C. (corr.).

Example 235

2-(7-aza-3-indoyl)ethylguanidine hydrobromide [Ic: Ar is 7-aza-3-indoyl; Y is (CH$_2$)$_2$; $n$ is 1] was prepared from 15 g. (0.09 mole) of 2-(7-aza-3-indolyl)ethylamine, and 25.8 g. (0.103 mole) of ethyl isothiouronium bromide in 100 ml. of water using the manipulative procedure described above in Example 234. There was thus obtained 18 g. of crude product which on recrystallization from methanol/ether gave 16.5 g. of 2-(7-aza-3-indoyl)ethylguanidine hydrobromide, M.P. 259.6–261.0° C. (corr.).

By following the manipulative procedure described above in Examples 234 or 235, 7-aza-3-indolylmethylguanidine sulfate hydrate, M.P. 256.6–258.0° C. (corr.) (recrystallized from water) [Ic: Ar is 7-aza-3-indolyl; Y is CH$_2$; $n$ is 1] was prepared by reaction of 7-aza-3-indolylmethylamine with methyl isothiouronium sulfate.

Examples 236–285

By reacting an appropriate aryl-alkylamine with a lower-alkyl isothiouronium halide using the manipulative procedure described above in Example 234, there can be obtained the compounds of Formula Ic listed below in Table 9.

TABLE 9

| Ex. | Ar | Y | $n$ |
|---|---|---|---|
| 236 | 7-aza-1-indolyl | (CH$_2$)$_2$ | 1 |
| 237 | 1,3-(7-azaindolyl) | (CH$_2$)$_2$ | 2 |
| 238 | 1-indolyl | (CH$_2$)$_2$ | 1 |
| 239 | 3-CH$_3$-1-indolyl | (CH$_2$)$_2$ | 1 |
| 240 | 2-Cl-10-phenothiazinly | (CH$_2$)$_2$ | 1 |
| 241 | 1-benzimidazolyl | (CH$_2$)$_2$ | 1 |
| 242 | 1,3-(7-azaindolyl) | (3-)(CH$_2$)$_3$ / (1-)(CH$_2$)$_2$ | 2 |
| 243 | 2-CH$_3$-3-indolyl | (CH$_2$)$_5$ | 1 |
| 244 | 5,6-OCH$_2$O-3-indolyl | (CH$_2$)$_3$ | 1 |
| 245 | 5,6-di-CH$_3$O-3-indolyl | (CH$_2$)$_3$ | 1 |
| 246 | 2-CH$_3$-1,3-indolyl | (CH$_2$)$_3$ | 2 |
| 247 | 7-aza-1-indolyl | (CH$_2$)$_3$ | 1 |
| 248 | 2-CH$_3$-1-indolyl | (CH$_2$)$_3$ | 1 |
| 249 | 3-CH$_3$-1-indolyl | (CH$_2$)$_3$ | 1 |
| 250 | 5-C$_6$H$_5$CH$_2$O-1-indolyl | (CH$_2$)$_2$ | 1 |
| 251 | 4-Cl-3-indolyl | (CH$_2$)$_3$ | 1 |
| 252 | 2-CH$_3$-7-aza-3-indolyl | (CH$_2$)$_2$ | 1 |
| 253 | 7-aza-3-indolyl | CH$_2$ | 1 |
| 254 | 1-CH$_3$-7-aza-3-indolyl | (CH$_2$)$_2$ | 1 |
| 255 | 1-C$_6$H$_5$CH$_2$-7-aza-3-indolyl | (CH$_2$)$_2$ | 1 |
| 256 | 4-Cl-2-indolyl | CH$_2$ | 1 |
| 257 | 2-Br-5-(dibenzo[a,d][1,4]cycloheptadienylidenyl) | (CH$_2$)$_6$ | 1 |
| 258 | 6-F-2-indolyl | (CH$_2$)$_3$ | 1 |
| 259 | 6-I-2-aza-1-indolyl | (CH$_2$)$_3$ | 1 |
| 260 | 6-CF$_3$-2-aza-3-indolyl | CH(CH$_3$)CH$_2$ | 1 |
| 261 | 3-CH=NOH-4-aza-1-indolyl | (CH$_2$)$_4$ | 1 |
| 262 | 3-CH$_2$N(CH$_3$)$_2$-5-aza-1-indolyl | (CH$_2$)$_3$ | 1 |
| 263 | 6-aza-1-indolyl | CH(CH$_3$)CH$_2$CH$_2$ | 1 |
| 264 | 4-aza-2-indolyl | (CH$_2$)$_3$ | 1 |
| 265 | 5-aza-2-indolyl | (CH$_2$)$_3$ | 1 |
| 266 | 6-aza-2-indolyl | (CH$_2$)$_3$ | 1 |
| 267 | 7-aza-2-indolyl | (CH$_2$)$_3$ | 1 |
| 268 | 4-aza-3-indolyl | (CH$_2$)$_3$ | 1 |
| 269 | 5-aza-3-indloyl | (CH$_2$)$_3$ | 1 |
| 270 | 6-aza-3-indolyl | (CH$_2$)$_4$ | 1 |
| 271 | 2-pyrrolyl | CH(CH$_3$)CH$_2$CH$_2$ | 1 |
| 272 | 3-pyrrolyl | (CH$_2$)$_3$ | 1 |
| 273 | 1-pyrazolyl | (CH$_2$)$_3$ | 1 |
| 274 | 3-pyrazolyl | (CH$_2$)$_3$ | 1 |
| 275 | 4-pyrazolyl | (CH$_2$)$_3$ | 1 |
| 276 | 1-imidazolyl | (CH$_2$)$_3$ | 1 |
| 277 | 2-imidazolyl | (CH$_2$)$_3$ | 1 |
| 278 | 4-imidazolyl | (CH$_2$)$_4$ | 1 |
| 279 | 6-CH$_3$S-1-[1H-benzotriazolyl] | (CH$_2$)$_3$ | 1 |
| 280 | 6-CH$_3$SO-2-[2H-benzotriazolyl] | (CH$_2$)$_3$ | 1 |
| 281 | 3-CH$_3$SO$_2$-5-(10,11-dihydro-5H-dibenzo-[b,f]azepinyl) | (CH$_2$)$_3$ | 1 |
| 282 | 6-F-1-benzimidazolyl | (CH$_2$)$_3$ | 1 |
| 283 | 6-CF$_3$-2-benzimidazolyl | (CH$_2$)$_3$ | 1 |
| 284 | 1-pyrrolyl | (CH$_2$)$_3$ | 1 |
| 285 | 3-(pyrido-[2,1-c]-s-triazolyl) | (CH$_2$)$_4$ | 1 |

Pharmacological evaluation of the compounds of Formula Ia has demonstrated that they lower the blood pressure in rats and mice; they possess psychomotor stimulant as well as depressant activities as evidenced by studies in mice using standard activity cages; and they possess sedative activity as shown by the potentiation of sleeping time in mice induced by ether, thiopental sodium, or hexobarbital sodium. These activities indicate their usefulness as hypotensive agents, tranquilizers, and sedatives.

Hypotensive activity data are given for representative compounds of Formula Ia in Table 10 below where each of the compounds is identified by the number of the example above where its preparation is described. The activities are expressed in terms of the AED, i.e. the Average Effective Dose. As used hereinafter, the abbreviations i.p., p.o., and s.c. designate intraperitoneal, peroral, and subcutaneous administration, respectively.

TABLE 10
Hypotensive activity

| Example: | Activity, mg./kg. (s.c.) |
|---|---|
| 113 | 80 |
| 114 | 40 |
| 115 | 60 |
| 116 | 15 |
| 118 | 20 |
| 121 | 8 |
| 122 | 5 |
| 123 | 20 |
| 124 | 20 |
| 125 | 20 |
| 126 | 40 |
| 127 | 10 |
| 129 | 20 |
| 132 | 50 |
| 133 | 9 |
| 138 | 80 |
| 139 | 10 |

Psychomotor depressant activity data are given for representative compounds of Formula Ia in Table 11 below. The activties are expressed in terms of the minimum effective dose (MED) and of the percent decrease in motor activity.

TABLE 11

| Example: | Activity, percent |
|---|---|
| 119—MED=300 mg./kg. (p.o.) | 55 |
| 121—MED=300 mg./kg. (p.o.) | 65 |
| 122—MED=300 mg./kg. (p.o.) | 59 |
| 123—MED=100 mg./kg. (p.o.) | 61 |
| 133—MED=300 mg./kg. (p.o.) | 78 |

Certain of the compounds also possess psychomotor stimulant activity in mice as evidenced by their ability to increase the motor activity of mice in activity cages. Thus β-(5-benzyloxy-1-indolyl)propionamidoxime, described above in Example 132 was active at 12 mg./kg. (p.o.), producing a 178% increase in motor activity.

Other compounds possess sedative activity as evidenced by their ability to potentiate the sleeping time in mice induced by hexobarbital sodium. Thus the effective dose, ED$_{50}$, of β-(2-chloro-10-phenothiazinyl)propionamidoxime, described above in Example 136, in potentiating the sleeping time in mice to which hexobarbital had been administered was found to be 45.5±8.7 mg./kg. (i.p.).

The compounds of formula Ib have been found to possess hypotensive activity as determined in the renal hypertensive rat. Thus (7-aza-3-indolyl)acetamidine hydrochloride, described above in Example 183, was found to have an average effective dose, AED, of 8 mg./kg. when administered subcutaneously in the renal hypertensive rat.

The compounds of Formula Ic have also been found to possess hypotensive activity as determined in the renal hypertensive rat. Thus 2-(7-aza-3-indolyl)ethylguanidine hydrobromide, described above in Example 235, was found to have an average effective dose, AED, of 30 mg./kg. when administered subcutaneously in the renal hypertensive rat.

I claim:
1. A compound of the formula

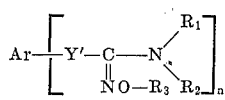

wherein
Ar is 2-, 4-, 5-, 6- or 7-azaindolyl;
$R_1$ is hydrogen, lower-alkyl, lower-alkanoyl, or hydroxy;
$R_2$ is hydrogen or lower-alkyl;
$R_3$ is hydrogen, lower-alkanoyl, or lower-alkyl;
$Y'$ is a single chemical bond or alkylene of from one to five carbon atoms; and
$n$ is one of the integers 1 and 2.

2. A compound according to claim 1 wherein Ar is 7-azaindolyl; $R_1$ and $R_2$ are hydrogen; $R_3$ is hydrogen or lower-alkanoyl; and $Y'$ is alkylene of from one to five carbon atoms.

3. A compound according to claim 2 wherein Ar is 7-aza-3-indolyl; $R_3$ is hydrogen; and $n$ is 1.

4. A compound according to claim 2 wherein Ar is 7-aza-3-indolyl; $R_3$ is lower-alkanoyl; and $n$ is 1.

5. α-(1-methyl-7-aza-3-indolyl)acetamidoxime according to claim 3 wherein Ar is 1-methyl-7-aza-3-indolyl; and $Y'$ is methylene.

6. α-(7-aza-3-indolyl)acetamidoxine according to claim 3 wherein Ar is 7-aza-3-indolyl; and $Y'$ is methylene.

7. β-(7-aza-3-indolyl)propionamidoxime according to claim 3 wherein Ar is 7-aza-3-indolyl; and $Y'$ is 1,2-ethylene.

8. α-(7-aza-3-indolyl)acetamidoxine O-acetate according to claim 4 wherein Ar is 7-aza-3-indolyl; $R_3$ is acetyl; and $Y'$ is methylene.

9. A compound of the formula

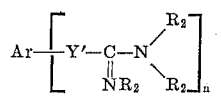

wherein
Ar is 2-, 4-, 5-, 6- or 7-azaindolyl;
$R_2$ is hydrogen or lower-alkyl;
$Y'$ is a single chemical bond or alkylene of from one to five carbon atoms; and
$n$ is one of the integers 1 and 2.

10. A compound according to claim 9 wherein Ar is 7-azaindolyl; $R_2$ is hydrogen; $Y'$ is alkylene of from one to five carbon atoms; and $n$ is 1.

11. α-(7-aza-3-indolyl)acetamidine according to claim 10 wherein Ar is 7-aza-3-indolyl; and $Y'$ is methylene.

12. A compound of the formula

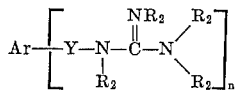

wherein
Ar is azaindolyl;
$R_2$ is hydrogen or lower-alkyl;
Y is alkylene of from one to six carbon atoms; and
$n$ is one of the integers 1 to 2.

13. A compound according to claim 12 wherein Ar is 7-azaindolyl; $R_2$ is hydrogen; and $n$ is 1.

14. 2 - (7 - aza-3-indolyl)ethylguanidine according to claim 13 wherein Ar is 7-aza-3-indolyl; and Y is 1,2-ethylene.

15. 2-(2-methyl-7-aza-3-indolyl)ethylguanidine according to claim 13 wherein Ar is 2-methyl-7-aza-3-indolyl; and Y is 1,2-ethylene.

16. (7-aza - 3 - indolyl)methylguanidine according to claim 13 wherein Ar is 7-aza-3-indolyl; and Y is methylene.

References Cited

UNITED STATES PATENTS

| | | |
|---|---|---|
| 2,387,323 | 10/1945 | Gaynor et al. |
| 2,389,681 | 11/1945 | Mikeska _____ 260—564 |
| 3,074,957 | 1/1963 | Schaefer et al. |
| 3,105,837 | 10/1963 | Ursprung _____ 260—309.2 |
| 3,133,081 | 5/1964 | Lafferty et al. _____ 260—564 |
| 3,139,455 | 6/1964 | Campbell. |
| 3,174,997 | 3/1965 | Campbell. |

FOREIGN PATENTS

| | | |
|---|---|---|
| 17,134 | 11/1960 | Japan. |
| 6,783 | 5/1963 | Japan. |

OTHER REFERENCES

Migrdichian Organic Synthesis, vol. I, pp. 429–31, New York, 1957.

Mull et al.: Jour. Amer. Chem. Soc., vol. 80, pp. 3769–72, 1958.

HENRY R. JILES, Primary Examiner

ALAN L. ROTMAN, Assistant Examiner

U.S. Cl. X.R.

260—296, 310, 564; 424—999

PO-1050
(5/69)

UNITED STATES PATENT OFFICE
CERTIFICATE OF CORRECTION

Patent No. 3,478,039          Dated   November 11, 1969

Inventor(s)  Malcolm R. Bell

It is certified that error appears in the above-identified patent and that said Letters Patent are hereby corrected as shown below:

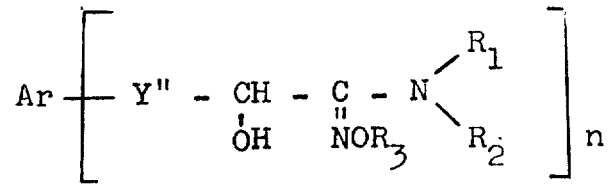

Column 2, lines 60 and 68, "formula" should read in each instance --formulas--; line 61, "represents" should read --represent--; and line 62, "and" should read --or--. Column 3, line 55, "is" should read --are--. Column 6, line 12, "salts" should read --salt--; and line 63, "ane" should read --any--. Column 8, line 37, "γ-[5-(10,11)" should read --γ [5-(10,11- --; and lines 68 and 69, "(uncorr.)" should read --(corr.)--. Column 10, line 16, Example 17, "150.3-152.0°C." should read --b.p. 150.3-152.0°C.--. Column 11, line 17, "ethanol 11.1 g." should read --ethanol giving 11.1 g.--; and line 70, "1-$C_6H_6CH_2$-7" should read --1-$C_6H_5CH_2$-7 --. Column 12, line 57, Example 58, "6-$CF_2$-2-" should read --6-$CF_3$-2- --. Column 15, line 61, "170.0-179.0°C. should read --178.0-179.0°C.--; and line 74, "actate" should read --acetate--. Column 17, line 28, "indoyl" should read --indolyl--; and line 46, "acetohydrozamic" should read --acetohydroxamic--. Column 18, line 54, Example 203, "1-$C_6H_7CH_2$-7-" should read --1-$C_6H_5CH_2$-7- --. Column 19, lines 2, 5, 11, and 15, "indoyl" should read in each instance --indolyl--; line 42, Example 240, "2-Cl-10-phenothiazinly" should read --2-Cl-10-phenothiazinyl--; and line 63, Example 269, "5-aza-3-indoyl" should read --5-aza-3-indolyl--. Column 20, line 42, "activties" should read --activities--. Column 21, line 29, claim 6 and line 34, claim 8, "acetamidoxine" should read --acetamidoxime--.

PO-1050
(5/69)

UNITED STATES PATENT OFFICE
CERTIFICATE OF CORRECTION

Patent No. 3,478,039          Dated November 11, 1969

Inventor(s) Malcolm R. Bell          PAGE 2

It is certified that error appears in the above-identified patent and that said Letters Patent are hereby corrected as shown below:

Column 22, line 10, claim 12, "Ar is: azaindolyl;" should read
--Ar is: 2-, 4-, 5-, 6-, or 7-azaindolyl--.

SIGNED AND
SEALED
JUN 16 1970

(SEAL)
Attest:

Edward M. Fletcher, Jr.
Attesting Officer

WILLIAM E. SCHUYLER, JR
Commissioner of Patents